No. 766,669. PATENTED AUG. 2, 1904.
F. M. CONROY.
SIDE DELIVERY HAY RAKE.
APPLICATION FILED FEB. 20, 1903.
NO MODEL. 3 SHEETS—SHEET 3.
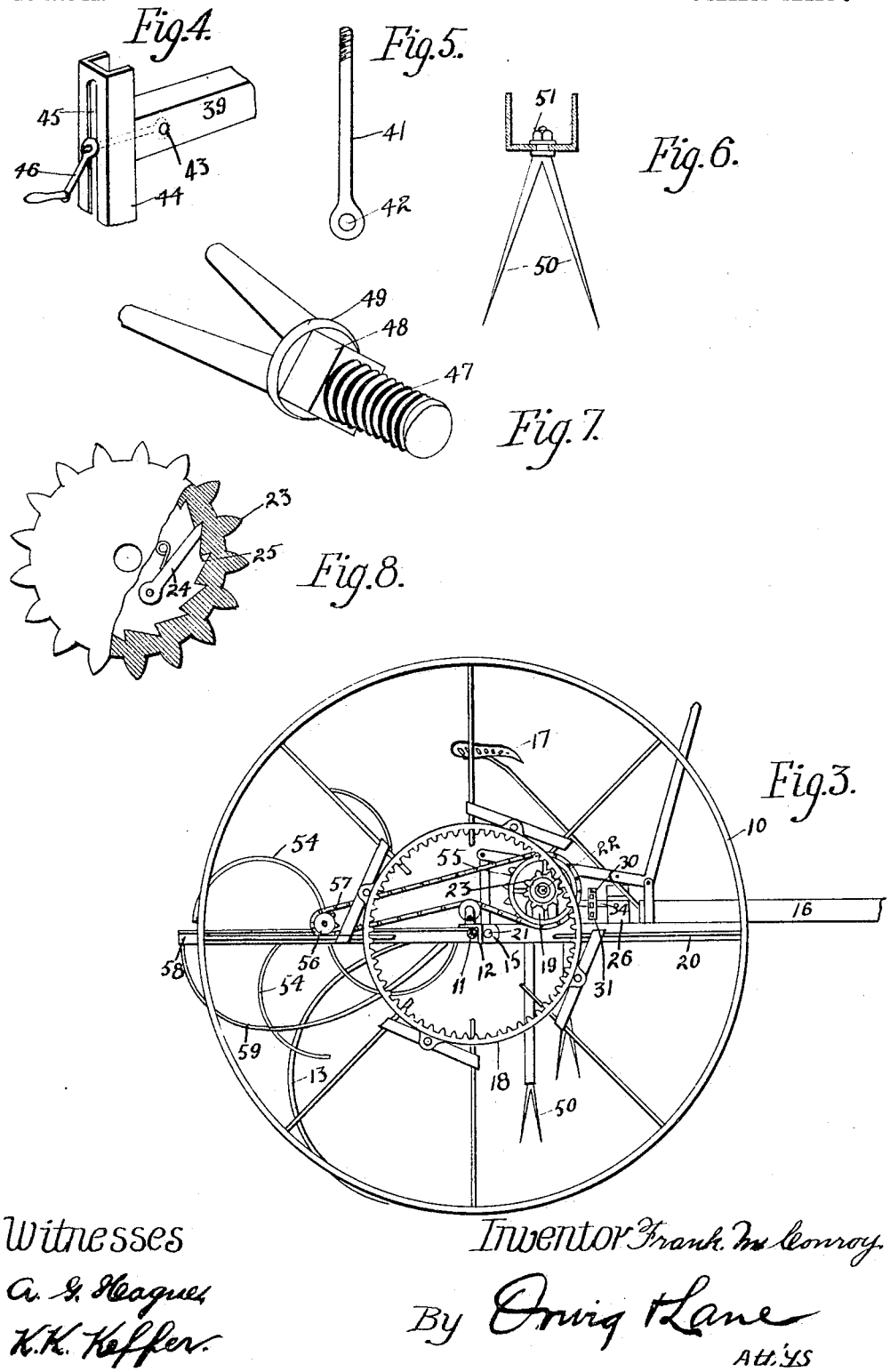

No. 766,669.                                              Patented August 2, 1904.

UNITED STATES PATENT OFFICE.

FRANK M. CONROY, OF FONDA, IOWA.

SIDE-DELIVERY HAY-RAKE.

SPECIFICATION forming part of Letters Patent No. 766,669, dated August 2, 1904.

Application filed February 20, 1903. Serial No. 144,249. (No model.)

*To all whom it may concern:*

Be it known that I, FRANK M. CONROY, a citizen of the United States, residing at Fonda, in the county of Pocahontas and State of Iowa, have invented certain new and useful Improvements in Side-Delivery Hay-Rakes, of which the following is a specification.

The objects of my invention are to provide a device of simple, durable, and inexpensive construction that may be used in the nature of an attachment to be applied to any ordinary hay-rake and driven by power obtained from the supporting-wheels of the rake and designed when the rake is advanced over a field to carry the hay in front of the rake to one side of the rake and deposit it on the ground-surface in a windrow, so the hay may be conveniently gathered.

A further object is to provide a device of this class in which the hay-rake is advanced over the ground-surface with the rake standing in position approximately at right angles to the line of advance, thus utilizing the full width of the rake in covering the ground each time the rake is passed over the ground, as distinguished from that class of side-delivery hay-rakes in which the rake stands at an angle of about forty-five degrees relative to the line of advance, and hence a comparatively small portion of the ground is covered by each movement of the rake.

A further object is to provide a device of this class that may be used successfully as a hay-tedder by simply elevating the rake from contact with the ground-surface.

My invention consists in certain details in the construction, arrangement, and combination of the various parts of the device whereby the objects contemplated are attained, as hereinafter more fully set forth, pointed out in my claims, and illustrated in the accompanying drawings, in which—

Figure 1:
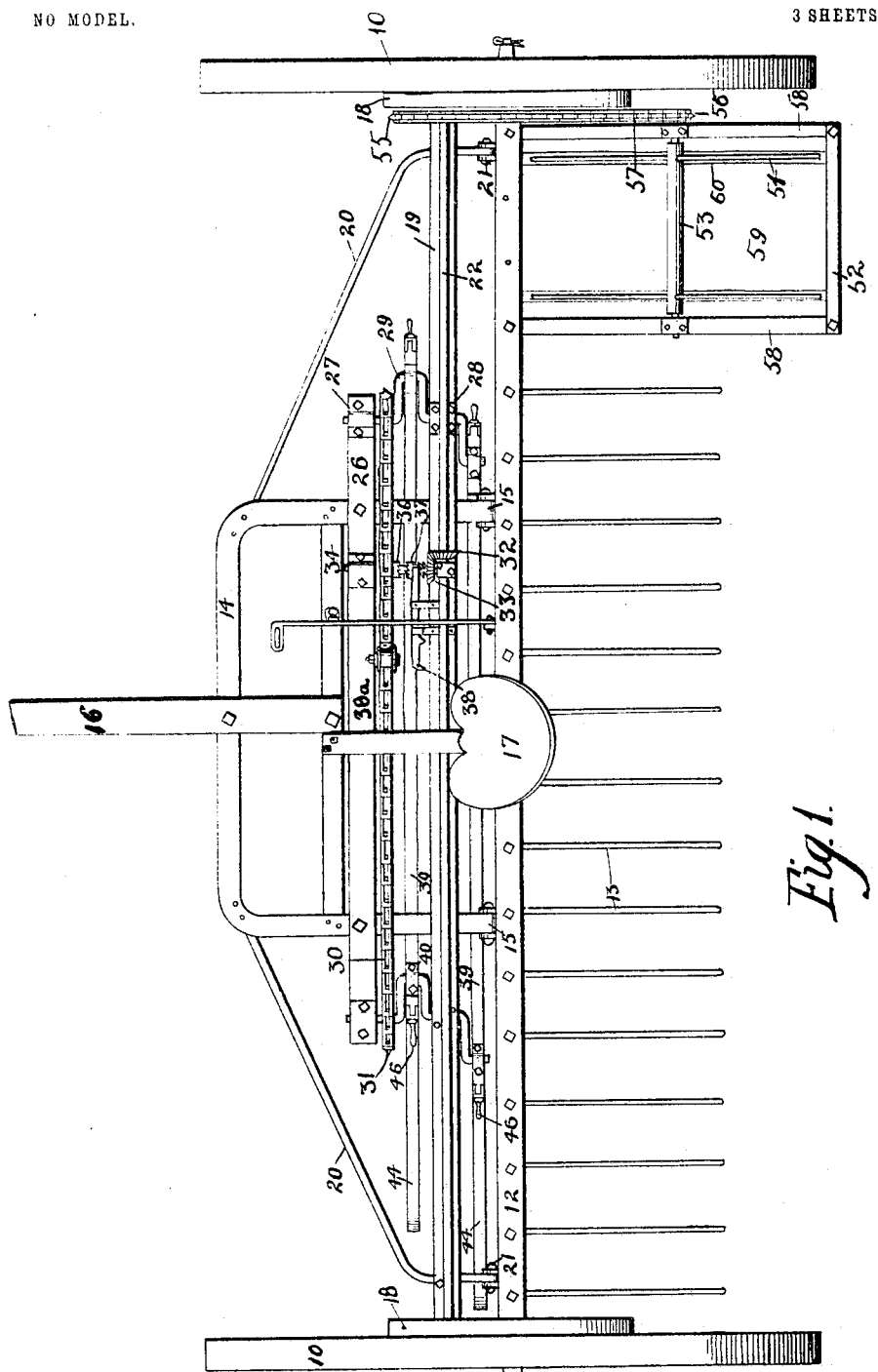
Figure 2:
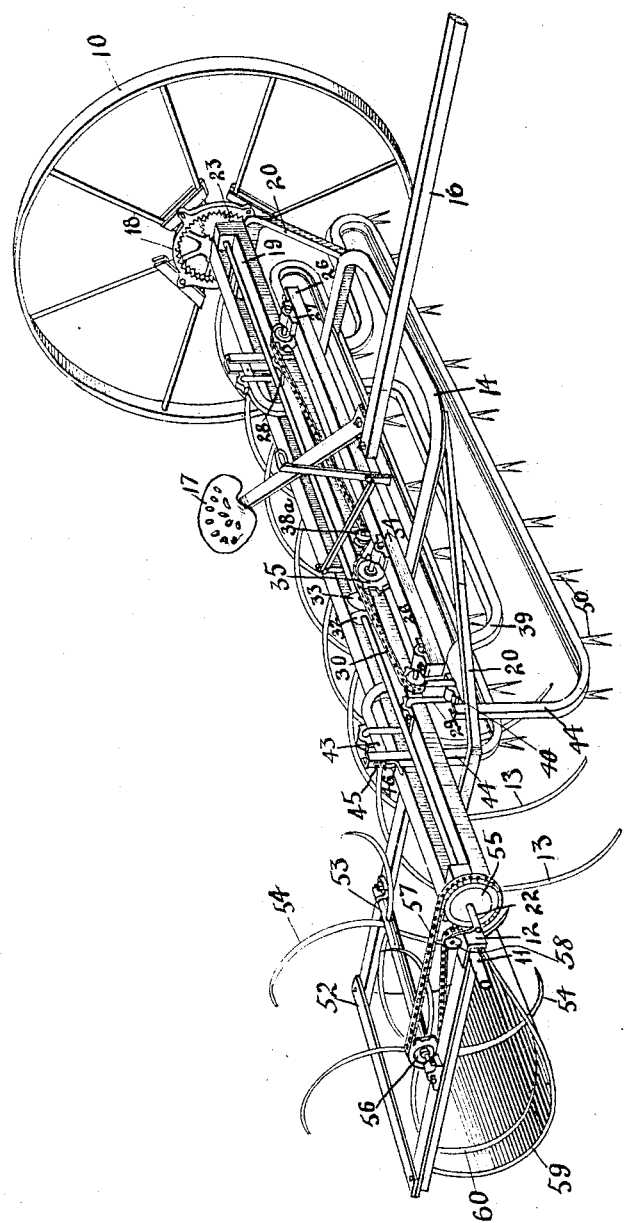

Figure 1 shows a top or plan view of a complete hay-rake with my improved side-delivery attachment applied thereto as in practical use. Fig. 2 shows a perspective view of the same with one of the traction-wheels removed. Fig. 3 shows a side elevation of the complete device with the hub of one of the traction-wheels removed. Fig. 4 shows a detail perspective view illustrating the means by which the toothed bar is made vertically adjustable. Fig. 5 shows an enlarged detail view of the screw-threaded rod which is illustrated in dotted lines in Fig. 4. Fig. 6 shows a sectional view through one of the rake-bars, illustrating one of the forked teeth attached thereto. Fig. 7 shows an enlarged perspective of one of the forked teeth detached; and Fig. 8 shows a side elevation of one of the pinions for driving the side-delivery mechanism, parts being broken away to illustrate the spring-actuated ratchet device on its interior.

Referring to the accompanying drawings, I have used the reference-numeral 10 to indicate the supporting-wheels of the rake, said wheels being mounted upon the stationary shaft 11, which shaft is fixed in the angle-bar 12. The curved rake-teeth 13 are connected with this angle-bar 12 in the ordinary way. In front of the central portion of the angle-bar 12 is a substantially U-shaped frame 14, hinged at 15 to the angle-bar 12, and the tongue 16 and seat 17 are supported in this frame. All of the parts just described are of the ordinary form and construction now in common use, and my invention is especially designed with a view of adapting it to attachment with any of the ordinary forms of hay-rake.

My attachment comprises two rims 18, having internal gear-teeth and detachably secured to the spokes of the wheels 10, so as to be centered upon said wheels. In front of the angle-bar 12 is a cross-piece 19, with its central portion resting upon the frame 14 and its end supported by the braces 20, which braces have their forward ends attached to the forward corners of the frame 14 and their rear ends hinged at 21 to the angle-bar 12. Mounted upon said cross-piece 19 is a shaft 22, having on each end a pinion 23, each of said pinions being provided with an internal spring-actuated pawl 24, coacting with the internal ratchet-teeth 25, by which the shaft 22 is moved only in one direction, and when the pinion 23 rotates in the opposite direction the shaft is held stationary and the pawl moves over the ratchet-teeth. By this means I have provided a shaft 22, which is rotated during the advance of the machine over the ground-surface, and it is held stationary when either one or both of the traction-wheels turn rearwardly.

Mounted upon the frame 14 in front of the cross-piece 19 is a short cross-piece 26. On the end portions of the cross-piece 26 I have provided bearings 27 in line with similar bearings 28 on the cross-piece 19, and in these bearings are mounted the crank-shafts 29, each one of which has two crank-arms extended in diametrically opposite directions. These crank-arms are connected so that they will rotate in unison by means of the sprocket-chain 30, passing around the wheels 31, which are fixed to the crank-shafts 29. This chain is driven during the advance of the machine by means of the beveled gear-wheel 32, fixed to shaft 22 and meshed with a beveled gear-wheel 33, mounted upon a short shaft 34. On this short shaft 34 the sprocket-wheel 35 is rotatably mounted, and it engages sprocket-chain 30, and it is provided with a ratchet-faced hub 36. Slidingly mounted on the shaft 34 is a spring-actuated clutch device 37, designed to engage the ratchet-faced hub 36. This clutch device 37 is slidingly and non-rotatably mounted on the shaft 34 and is controlled by a foot-lever 38, so that the operator may by pressing his foot on the lever 38 throw the ratchet-clutch out of gear, thus stopping the movements of chain 30. However, the spring-actuated clutch is normally in operative engagement with the ratchet-hub 36. I have provided an idler 38ª to hold the chain 30 in engagement with sprocket-wheel 35.

The means I have employed for moving the hay laterally in front of the rake-teeth comprises two raking devices, each of which consists of a bar 39, curved downwardly at its central portion to clear the frame 14 and having bearings 40 at its ends mounted upon the crank-arms of the shafts 29. In each of the bars 39 is a screw-threaded rod 41, having an eye 42 at one end to receive a pin 43, which pin is passed through the bar 39, thus securing the rod to the bar 39, the screw-threaded end of the rod projecting beyond the end of the bar. The rake-teeth are carried by the second bar, the ends of which are arranged vertically at 44, and these vertical ends are provided with vertical slots 45, through which the rods 41 pass, and on the exterior of each of the ends 44 is a crank-nut 46 to be screwed to the end of the rod 41. By this means the ends 44 are made vertically adjustable relative to the bar 39.

The central portion of each of the rods 44 is straight, and preferably arranged in a substantially horizontal plane and at regular intervals throughout its length are forked teeth constructed and attached to the bar as follows: At the top of each tooth is a screw-threaded shank 47, and below the shank 47 is a squared head 48. Beneath the squared head is a round rim 49, and beneath the rim are the forked and pointed extensions 50. The teeth are connected with the bar 44 by having the squared portions 48 thereof passed through squared openings in the bar, and a nut 51 is placed on the screw-threaded portion above the bar. By this means the teeth are prevented from turning or twisting in the bar and are firmly held in position. The motion of the crank-arms 29 is arranged in such a direction that the bars 44 move toward the delivery end of the rake when at their lower limit of movement, and the said bars are so positioned with relation to the rake-teeth that as the rake is being advanced over the field and the hay accumulates in front of the rake-teeth the said toothed bars will engage the hay and move it toward the delivery side of the machine. If the teeth do not enter the hay as far as may be desired, the toothed bars 44 may be quickly and easily adjusted by a manipulation of the crank-nuts 46, thus loosening the ends of the bars and permitting them to be vertically adjusted. Furthermore, one end of the bar 44 may be elevated more than the other, if desired.

I have also provided means whereby the hay may be discharged in a windrow at one side of the rake and packed down in an even manner, so as to hold it as near as may be possible in position in the windrow, said means also serving to prevent the accumulation of hay at the discharge end of the hay-rake under the axle. Said means comprises an extension-frame 52, projecting rearwardly from the right side of the angle-bar 12. To provide room for this frame 52, I remove two or three of the rake-teeth. Mounted in the central portion of the frame 52 is a shaft 53, having thereon a series of curved arms 54. This shaft 53 is driven from the shaft 22 by means of a sprocket-wheel 55 on the shaft 22 and a sprocket-wheel 56 on the shaft 53, connected by a sprocket-chain 57. An idler 58 is provided to hold the sprocket-chain from engagement with the angle-bar 12.

The numeral 59 indicates a sheet-metal guide fixed to frame 52 and provided with slots 60, through which the curved teeth 54 may pass.

In use the curved arms 54 are rotated slowly during the advance of the machine and at their forward limit of movement pass directly in the rear of the angle-bar 12. They project downwardly through the sheet-metal guide 59, and if any hay has accumulated directly under the angle-bar 12 the said arms will force the hay downwardly and rearwardly until it passes to a point beyond the lower portion of the guide 59. This guide is so shaped that the arms 54 will withdraw through the slot 60 when near the rear of the guide, thus preventing the hay from becoming entangled with the said arms. These arms serve the double function of preventing the accumulation of hay under the machine-frame, and they also serve to pack the hay in compact and evenly-formed windrows.

In practical operation I adapt an ordinary hay-rake for use in connection with my attachment as follows: I first detach two or three of the rake-teeth at the right side of the machine. I then clamp to the wheels the cog-rims and place upon the machine-frame the cross-bars and braces constituting the frame of my attachment. I then place the gearing device in position, meshed with each other and with the cog-rims. I then place the extension-frame at the right side thereof at the point where the rake-teeth have been removed. The device is then ready for use. When the machine is advanced over the ground-surface, the hay will accumulate in front of the rake-teeth, and the toothed bars will on the lower half of their movement engage the hay and force it toward the right side of the machine-frame. When the hay is discharged from the ends of the toothed bars, it will be piled under the machine-frame, and the curved arms in the extension will engage it and force it rearwardly. By this means the hay-rake is made to cover as wide a path as though the teeth had not been removed for the reason that the curved arms will lay the windrow of hay in the same place where the teeth have been removed. Thus the entire width of the machine between the wheels is utilized.

The attachment is readily adapted for either heavy or light crops of hay by elevating or lowering the toothed bars, and the machine will run with about the same amount of applied power as an ordinary hay-rake, because the draft-animals do not need to carry a large amount of hay at any one time. Hence the power required to drag a large quantity of hay in front of the rake-teeth is not necessary, because the toothed bars always keep the surplus hay away from the rake-teeth.

If the rake is elevated from the ground-surface and the machine is advanced, then the oscillating teeth will engage the hay and turn it over and loosen it, but will not carry it laterally to any material extent, because the hay is not carried forward by the rake and the oscillating teeth only engage a given mass of hay once and then the machine leaves said mass and advances beyond it. Thus the machine may be successfully used as a tedder.

Having thus described my invention, what I claim, and desire to secure by Letters Patent of the United States therefor, is—

1. The combination with a hay-rake, of an oscillating toothed bar extending parallel with and in front of the hay-rake and coacting with the rake when the rake is in its lowered position to move the hay gathered by the rake laterally, and when the rake is elevated acting as a tedder, and means for raising and lowering the rake.

2. The combination of a hay-rake, means for raising and lowering the rake and for supporting it in an elevated position, and a toothed bar vertically adjustable extended parallel with and in front of the rake, and means actuated upon the advance of the rake for oscillating the toothed bar.

3. The combination of a machine-frame, supporting-wheels, a rake carried by the frame, means for raising and lowering the rake and for supporting it in its elevated position, a number of toothed bars horizontally arranged in front of the rake oscillated upon the advance of the machine and coacting with the rake to carry the hay gathered by the rake laterally, and when the rake is elevated acting as a tedder.

4. An improved side-delivery hay-rake, comprising a frame, supporting-wheels and rake-teeth, and two crank-shafts rotated by the supporting-wheels, a toothed bar carried by the crank-shafts positioned in front of the rake-teeth and moving longitudinally in a direction parallel with the rake.

5. An improved side-delivery hay-rake, comprising a frame, supporting-wheels and rake-teeth, and two crank-shafts, operatively connected with each other, means for rotating said shafts from the supporting-wheels, a bar mounted on the cranks, and a toothed bar vertically adjustable on said bar.

6. An improved side-delivery hay-rake, comprising a frame, supporting-wheels and rake-teeth, and two crank-shafts, operatively connected with each other, means for rotating said shafts from the supporting-wheel, a bar mounted on the cranks, and a toothed bar having each end independently adjustable on the said bar.

7. An improved side-delivery hay-rake, comprising in combination a frame, supporting-wheels on the frame, a series of rake-teeth connected with the frame, two crank-shafts mounted on the frame and operatively connected with each other, means for rotating the crank-shafts from the supporting-wheels, a bar fixed to the cranks and a toothed bar fixed to the said bar rotating in a plane parallel with the row of teeth and directly in advance of the teeth.

8. The combination with a hay-rake, comprising a frame, supporting-wheels mounted on the frame and a row of rake-teeth mounted on the frame, of cog-rims attached to the wheels, an auxiliary frame detachably connected with the machine-frame, a shaft mounted in the auxiliary frame, pinions on its ends meshed with the said rims, two crank-shafts extending fore and aft of the machine driven in unison from the said shaft during the advance of the machine, two parallel bars mounted on the crank-arms of the shafts, two toothed bars adjustably connected at their ends with the ends of said bars, said toothed bars moving parallel with the row of rake-teeth and directly in front of them, for the purposes stated.

9. The combination with a hay-rake, comprising a frame, supporting-wheels and a row of rake-teeth, of hay-advancing mechanism in front of the rake-teeth, said advancing mechanism operated from the supporting-wheels, and a series of curved arms rotating in a vertical plane in the rear of the machine-frame and at the end of the row of rake-teeth, said arms being operated by power from the supporting-wheels.

10. The combination with a hay-rake, comprising a frame, supporting-wheels and a row of rake-teeth, of hay-advancing mechanism in front of the rake-teeth, said advancing mechanism operated from the supporting-wheels, a frame extended from the machine-frame at one end of the row of rake-teeth, a shaft rotatably mounted in said frame, means for driving said shaft from the supporting-wheels, a number of curved arms on said shaft, and a slotted guide supported upon said frame having the curved arms operating through the slots thereof.

11. An improved side-delivery hay-rake, comprising in combination a machine-frame, supporting-wheels therefor, a number of curved rake-teeth on the machine-frame, a cross-bar supported by the machine-frame, a shaft mounted on the cross-bar, cog-rims borne by the supporting-wheels, pinions on the said shaft meshed with the cog-rim, a second cross-piece in front of the first resting on the machine-frame, two crank-shafts mounted on said cross-pieces, each having two crank-arms extended in opposite directions, means for gearing said crank-shafts together and means for driving the crank-shafts from the aforesaid shaft, means for throwing said crank-shaft-driving mechanism in or out of gear, a bar extended parallel with the row of rake-teeth having its ends connected with the forward crank-arms, a similar bar having its ends connected with the rearward crank-arms, a second bar attached to each of the aforesaid ones and extended downwardly therefrom, a series of forked teeth in each of the latter bars, a frame projecting rearwardly from the machine-frame, a curved slotted guide supported by said frame, a shaft supported by said frame, and curved arms fixed to the shaft and running through said slot, said shaft being driven from the supporting-wheels, substantially as and for the purposes stated.

12. In a device of the class described, the combination of a channel-bar having a squared opening therein, a forked tooth having a squared shank to pass through the squared opening and having a screw-threaded extension and a nut to secure the extension to the bar.

13. In a machine of the class described, a frame, supporting-wheels, a rake, means for moving hay laterally in front of the rake to a point of discharge, and arms rotated by the advance of the machine in a vertical plane parallel with a fore-and-aft line through the machine to engage hay at the discharge-point of the hay-advancing mechanism and force it downwardly and rearwardly.

14. In a machine of the class described, a frame, supporting-wheels, a rake, means for moving hay laterally in front of the rake to a point of discharge, and curved arms rotated by the advance of the machine in a vertical plane parallel with a fore-and-aft line through the machine to engage hay at the discharge-point of the hay-advancing mechanism and force it downwardly and rearwardly.

15. In a machine of the class described, a frame, supporting-wheels, a rake, means for moving hay laterally in front of the rake to one end of the rake, a rotatable shaft near said end of the rake, and driven upon the advance of the machine, and a number of arms fixed to the shaft at one end extending in the general direction in which the shaft rotates but curved gradually away from the shaft to force hay downwardly and rearwardly.

FRANK M. CONROY.

Witnesses:
GEO. STAFFORD,
FLETCHER H. HERROLD.